US009295890B2

(12) United States Patent
Gans

(10) Patent No.: US 9,295,890 B2
(45) Date of Patent: Mar. 29, 2016

(54) HOCKEY BLADE WITH WRAPPED, STITCHED CORE

(71) Applicant: BAUER HOCKEY, INC., Exeter, NH (US)

(72) Inventor: Adam Gans, Prevost (CA)

(73) Assignee: BAUER Hockey, Inc., Exeter, NH (US)

( * ) Notice: Subject to any disclaimer, the term of this patent is extended or adjusted under 35 U.S.C. 154(b) by 0 days.

(21) Appl. No.: 14/508,406

(22) Filed: Oct. 7, 2014

(65) Prior Publication Data

US 2015/0021818 A1 Jan. 22, 2015

Related U.S. Application Data

(63) Continuation of application No. 12/851,931, filed on Aug. 6, 2010, now Pat. No. 8,865,044, which is a continuation of application No. 12/048,976, filed on Mar. 14, 2008, now Pat. No. 7,824,591.

(51) Int. Cl.
| A63B 59/14 | (2006.01) |
| B29C 70/34 | (2006.01) |
| B29C 70/54 | (2006.01) |
| B29C 70/86 | (2006.01) |
| B29L 31/52 | (2006.01) |

(52) U.S. Cl.
CPC .................. *A63B 59/14* (2013.01); *A63B 59/70* (2015.10); *B29C 70/347* (2013.01); *B29C 70/54* (2013.01); *B29C 70/543* (2013.01); *B29C 70/865* (2013.01); *A63B 2102/24* (2015.10); *A63B 2209/023* (2013.01); *B29L 2031/52* (2013.01)

(58) Field of Classification Search
CPC .......................................... A63B 59/14
See application file for complete search history.

(56) References Cited

U.S. PATENT DOCUMENTS

| 3,934,875 A | 1/1976 | Easton et al. |
| 4,025,686 A | 5/1977 | Zion |
| 4,061,520 A | 12/1977 | Cecka et al. |
| 4,302,499 A | 11/1981 | Grisch |
| 4,591,155 A | 5/1986 | Adachi |
| 5,050,878 A | 9/1991 | Deleris |
| 5,078,396 A | 1/1992 | Cavallaro et al. |
| 5,152,856 A | 10/1992 | Thein et al. |
| 5,188,872 A | 2/1993 | Quigley |
| 5,217,221 A | 6/1993 | Baum |

(Continued)

FOREIGN PATENT DOCUMENTS

| CA | 2365484 A1 | 6/2003 |
| FR | 2638368 A1 | 5/1990 |

(Continued)

OTHER PUBLICATIONS

May 9, 2011—(EP) Search Report—App 11000112.0.

(Continued)

*Primary Examiner* — Larry Thrower
(74) *Attorney, Agent, or Firm* — Banner & Witcoff, Ltd.

(57) ABSTRACT

A construct for a hockey blade that includes a foam core. The foam core includes a first core face, a second core face, and a core edge. A first layer of resin preimpregnated tape is wrapped continuously around the first core face, the core edge and the second core face. A thread is stitched along the first layer of preimpregnated tape. A second layer of resin preimpregnated tape wrapped continuously around the first layer of resin preimpregnated tape.

21 Claims, 6 Drawing Sheets

(56) References Cited

U.S. PATENT DOCUMENTS

| | | | |
|---|---|---|---|
| 5,333,857 | A | 8/1994 | Lallemand |
| 5,407,195 | A * | 4/1995 | Tiitola et al. ............ 473/563 |
| 5,496,027 | A | 3/1996 | Christian et al. |
| 5,587,231 | A | 12/1996 | Mereer et al. |
| 5,672,120 | A | 9/1997 | Ramirez et al. |
| 5,741,574 | A * | 4/1998 | Boyce et al. ............ 428/119 |
| 5,888,329 | A | 3/1999 | Cho et al. |
| 6,062,996 | A | 5/2000 | Quigley et al. |
| 6,355,339 | B1 | 3/2002 | Sherwood |
| 6,864,297 | B2 | 3/2005 | Nutt et al. |
| 6,918,847 | B2 | 7/2005 | Gans et al. |
| 7,008,338 | B2 | 3/2006 | Pearson |
| 7,044,870 | B2 | 5/2006 | Pagotto |
| 7,097,577 | B2 | 8/2006 | Goldsmith et al. |
| 7,125,352 | B2 | 10/2006 | Gagnon et al. |
| 7,144,343 | B2 | 12/2006 | Goldsmith et al. |
| 7,232,386 | B2 | 6/2007 | Halko et al. |
| 7,261,787 | B2 | 8/2007 | Bellefleur et al. |
| 7,326,136 | B2 | 2/2008 | Jean et al. |
| 7,329,195 | B2 | 2/2008 | Pearson |
| 7,824,591 | B2 | 11/2010 | Gans |
| 2002/0025423 | A1 | 2/2002 | Dreher et al. |
| 2003/0119612 | A1 * | 6/2003 | Goldsmith et al. ........ 473/560 |
| 2004/0041128 | A1 * | 3/2004 | Carter et al. ............ 252/500 |
| 2004/0043181 | A1 | 3/2004 | Sherwood |
| 2004/0150130 | A1 | 8/2004 | Cundiff et al. |
| 2004/0235592 | A1 | 11/2004 | McGrath et al. |
| 2005/0074593 | A1 | 4/2005 | Day et al. |
| 2005/0176530 | A1 | 8/2005 | Sartor et al. |
| 2005/0236736 | A1 * | 10/2005 | Formella et al. ............ 264/258 |
| 2006/0142100 | A1 | 6/2006 | Pearson |
| 2006/0281592 | A1 | 12/2006 | Goldsmith et al. |
| 2007/0281810 | A1 | 12/2007 | Garcia |
| 2009/0149283 | A1 | 6/2009 | Garcia |
| 2009/0149284 | A1 | 6/2009 | Garcia |

FOREIGN PATENT DOCUMENTS

| | | |
|---|---|---|
| GB | 2075412 A | 11/1981 |
| GB | 2259667 A | 3/1993 |
| GB | 2262315 A | 6/1993 |

OTHER PUBLICATIONS

Jun. 10, 2010—(EP) Office Action—App 08252256.6.
Feb. 26, 2010—(EP) Office Action—App 08252256.6.
Jul. 29, 2009—(EP) Search Report—App 08252256.6.
Dec. 4, 2014—(EP) Office Action—App 11000112.0.

* cited by examiner

HOCKEY BLADE WITH WRAPPED, STITCHED CORE

CROSS REFERENCE TO RELATED APPLICATIONS

This Application is a continuation of U.S. application Ser. No. 12/851,931, filed Aug. 6, 2010 which is a continuation of U.S. application Ser. No. 12/048,976, filed Mar. 14, 2008, now U.S. Pat. No. 7,824,591, the entire contents of which are incorporated fully herein by reference.

FIELD OF THE INVENTION

This invention relates generally to fabrication of molded structures. More particularly, aspects of this invention relate to hockey blades molded from foam that is wrapped with a layer of tape, stitched, and wrapped with another layer of tape.

BACKGROUND

Typical hockey stick blades are generally made of a core reinforced with one or more layers of synthetic materials such as fiberglass, carbon fiber or Aramid. The core of the blade may also be made of a synthetic material reinforced with layers of fibers. The layers may be made of a woven filament fiber, preimpregnated with resin. Prior art structures have included a foam core with a layer of preimpregnated tape in the manner of pieces of bread on a sandwich, with a layer of tape on the top and bottom surfaces of the foam but not extending continuously along the edges of the core.

SUMMARY

The following presents a general summary of aspects of the invention in order to provide a basic understanding of the invention and various features of it. This summary is not intended to limit the scope of the invention in any way, but it simply provides a general overview and context for the more detailed description that follows.

Aspects of this invention relate to systems and methods for fabricating a formed structure with a stitched foam core. A foam core is formed. The foam core includes a first core face, a second core face, a top core edge and a bottom core edge. The foam core is wrapped with a first layer of fiber tape. The first layer of fiber tape extends continuously along the first core face, top core edge, second core face and bottom core edge of the foam core. The wrapped core has a first wrapped face, a second wrapped face, a top wrapped edge and a bottom wrapped edge.

The wrapped foam core is stitched with a thread. The thread extends between and along the first wrapped face and the second wrapped face.

The stitched wrapped core is wrapped with a second layer of fiber tape to form a wrapped preform. The second layer of fiber tape extends continuously atop the first layer of fiber tape and along the first wrapped face, the top wrapped edge, the second wrapped face and the bottom wrapped edge.

The wrapped preform is placed in a mold. The mold is heated and cooled. The formed structure is removed from the mold.

In an embodiment of the invention, the formed structure may be a hockey blade.

In an embodiment of the invention, the fiber tape is carbon fiber tape preimpregnated with resin and the second layer of tape is substantially thicker than the first layer.

In an embodiment of the invention, a single layer of fiber tape is used to wrap the foam core with a first layer of fiber tape and a plurality of layers of tape are used to wrap the stitched preform with a second layer of fiber tape.

The thread may be polyester or carbon fiber or carbon fiber preimpregnated with resin.

Other objects and features of the invention will become apparent by reference to the following description and drawings.

BRIEF DESCRIPTION OF THE DRAWINGS

A more complete understanding of the present invention and certain advantages thereof may be acquired by referring to the following detailed description in consideration with the accompanying drawings, in which.

The reader is advised that the attached drawings are not necessarily drawn to scale.

DETAILED DESCRIPTION

In the following description of various example structures in accordance with the invention, reference is made to the accompanying drawings, which form a part hereof, and in which are shown by way of illustration various structures in accordance with the invention. Additionally, it is to be understood that other specific arrangements of parts and structures may be utilized, and structural and functional modifications may be made without departing from the scope of the present invention. Also, while the terms "top" and "bottom" and the like may be used in this specification to describe various example features and elements of the invention, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of this invention.

In general, as described above, aspects of this invention relate to systems and methods for fabricating a structure, such as a hockey stick blade. More detailed descriptions of aspects of this invention follow.

Figure 1:
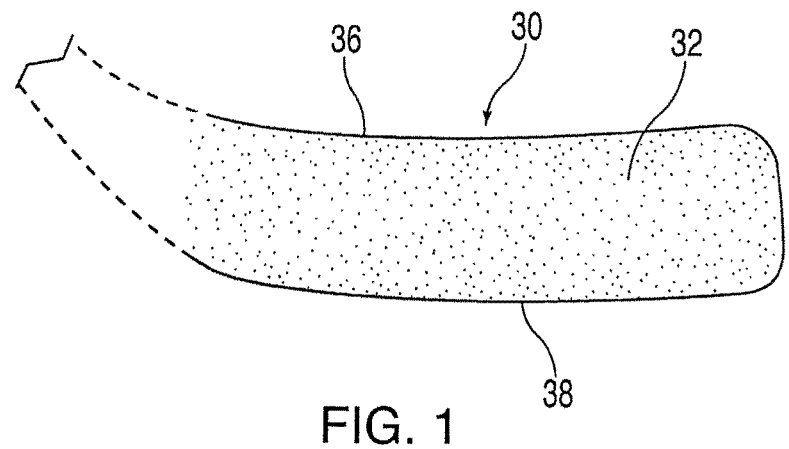
FIG. 1 generally illustrates a side view of foam formed in the shape of a blade.

FIG. 1 illustrates a foam core 30. The foam may be a polymethacrylimide (PMI) foam such as manufactured under the name Rohacell. A suitable low density PMI foam is RIMA (Resin Infusion Manufacturing Aid) foam. This type of foam is a high strength foam that can withstand the shear and impact forces that result when a hockey blade strikes a hockey puck.

Figure 6:
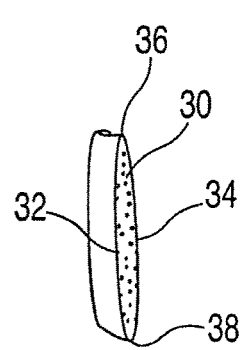
FIG. 6 is a perspective view of the blade of FIG. 2 with a cross sectional view taken along line 6-6.
Figure 2:
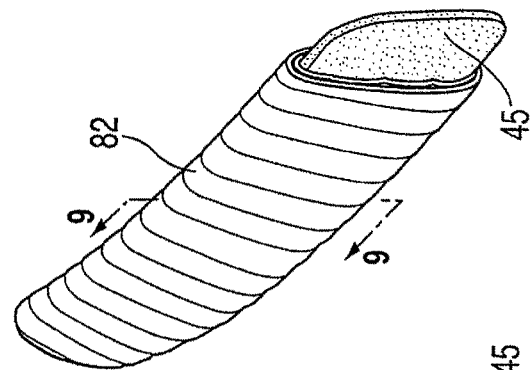
FIG. 2 is a perspective view of the blade of FIG. 1.

FIG. 2 is a perspective view of the foam core 30 of FIG. 1. An alternative view of the foam core 30 is shown in FIG. 6, which is perspective view of the foam core 30 of FIG. 2 along lines 6-6. The foam core 30 includes a first core face 32, a second core face 34, a top core edge 36 and a bottom core edge 38.

In FIG. 1 and FIG. 2, an outline of a handle portion of the structure is shown in dashed lines to illustrate how the foam core 30, once ultimately formed into a blade as described in this specification, is configured as part of a hockey stick that includes a blade and a handle.

Figure 7:
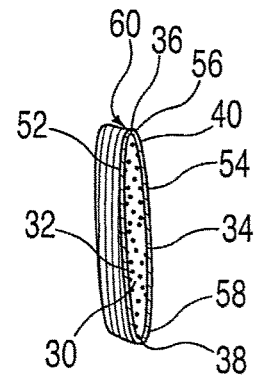
FIG. 7 is a perspective view of the blade of FIG. 3 with a cross sectional view taken along line 7-7.
Figure 3:
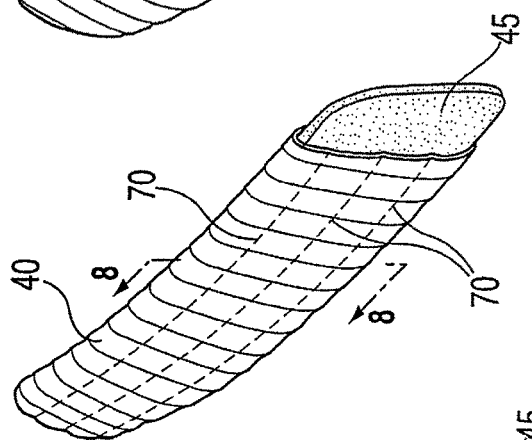
FIG. 3 is a perspective view of the blade of FIG. 2 after it is wrapped with a layer of tape.

Referring to FIG. 3 and FIG. 7, the foam core 30 is wrapped with a layer of carbon tape 40 that is preimpregnated with resin, resulting in a wrapped structure 60. The tape 40 is wrapped continuously around the first core face 32, the second core face 34, the top core edge 36 and the bottom core edge 38 of the foam core 30. This continuous wrapping of the foam core 30 with the tape 40 results in a first wrapped face 52, a second wrapped face 54, a top wrapped edge 56 and a bottom wrapped edge 58.

In one embodiment, the foam core 30 is wrapped with a single layer of carbon tape 40. Wrapping the foam core 30 with too many layers of carbon tape prior to stitching results in wrinkling of the tape when it is stitched, as discussed later in the specification. In FIG. 7, the thickness of the layer of tape 40 is exaggerated so that it can be more clearly illustrated.

In one embodiment, a veil or scrim material (not shown) in the form of a thin non-tacky layer of woven fiberglass or polyester is then placed along the first wrapped face 52. Another piece of such material is placed along the second wrapped face 54. The veil is placed on the wrapped faces 52, 54 in the manner of a sandwich, with a single layer of material on each face. The veil does not extend continuously around the wrapped edges 56, 58.

Figure 8:
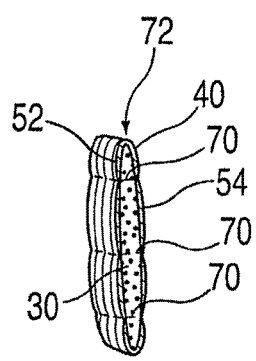
FIG. 8 is a perspective view of the blade of FIG. 4 with a cross sectional view taken along line 8-8.
Figure 4:
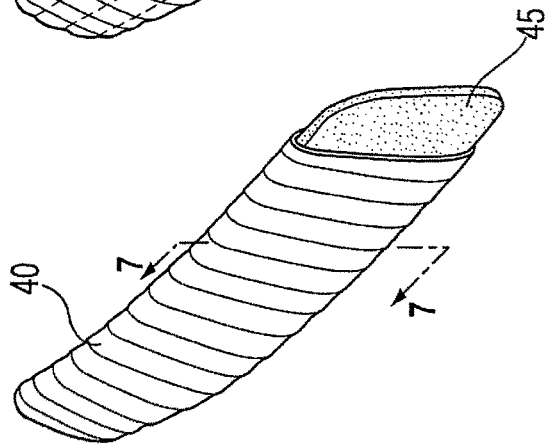
FIG. 4 is a perspective view of the blade of FIG. 3 after the blade is stitched.

As shown in FIG. 4 and FIG. 8, the wrapped core 40 is then stitched with a thread 70 to create a wrapped, stitched core 72. The thread 70 may be a high strength polyester thread that can withstand heating and maintain its physical properties at and above the temperature of the mold, 140 degrees C. The thread may also be a carbon fiber thread or a carbon fiber thread preimpregnated with resin.

The stitching is accomplished with an industrial sewing machine (not shown). Placement of structure wrapped with tape preimpregnated with resin in a sewing machine can cause the machine to stick or jam, and it can otherwise be difficult to operate the sewing machine with and on a sticky structure. The veil material described above is not sticky and thus makes it easier to stitch the wrapped core in the sewing machine.

As shown in FIG. 8, the thread extends from the first wrapped face 52 through the core 30 to the second wrapped face 54. The thread creates the effect of an I-beam between the first wrapped face 52 and the second wrapped face 54 and adds structural and shear strength and rigidity between the faces. If the veil (not shown in FIG. 8) were used, it would be positioned along the wrapped faces 52, 54, and the stitching 70 would be positioned along the veil.

As shown in FIG. 8, the thread 70 also pulls the tape 40 toward the first wrapped face 52 and the second wrapped face 54 and the point where the thread 70 enters the core 30. As is further illustrated in FIG. 8, the wrapped, stitched core 72 is not flat in that the result of the thread 70 pulling the tape 40 toward the core 30 and various locations creates a somewhat bumpy or pillow effect on the surface of the first wrapped face 52 and the second wrapped face 54. As with FIG. 7, the thickness of the tape 40 is exaggerated in FIG. 8 for purposes of more clearly illustrating the invention.

In one embodiment of the invention, the thread is stitched onto the tape 40 in a series of three parallel lines of stitching, as shown in FIG. 4 and FIG. 8. In an alternative embodiment of the invention (not shown), eight parallel lines of thread are used. In another embodiment, there is no set or predetermined pattern to the thread.

Figure 9:
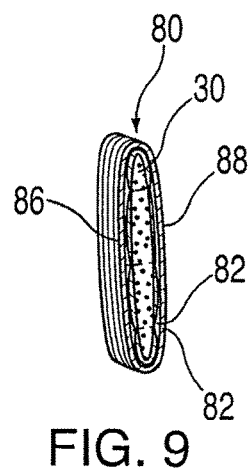
FIG. 9 is a perspective view of the blade of FIG. 5 with a cross sectional view taken along line 9-9.

The wrapped stitched core 72 is then wrapped with at least one additional, second layer of tape 82 to form a wrapped preform 80. The wrapped stitched core 72 may be wrapped with multiple layers of tape 82 as shown in FIG. 9. The tape 82 is made of the same material as the tape 40. The second layer of tape 82 extends continuously atop the first layer of fiber tape 40 and along the first wrapped face 52, the top wrapped edge 56, the second wrapped face 54 and the bottom wrapped edge 58. In an embodiment of the invention, 80-90% of the overall thickness of the tape is in the second layer and 10-20% of the thickness of the tape is in the first layer.

The wrapped blade includes 8-10 total layers of tape. One to three layers of tape are applied to the foam core prior to stitching, and five to nine layers of tape are applied after stitching and before insertion into the mold. For example, when eight total layers are used, different embodiments include different combinations of layers of tape before and after stitching, including one and seven; two and six; and three and five.

After stitching and the additional layer of tape are applied, the resulting faces are a first face 86 and a second face 88. The result of the additional layer or layers of tape 82 is that the face 86 and the face 88 do not have a bumpy or pillow effect. Rather the faces 86 and 88 are smooth and even, which is preferable for insertion into the mold and formation of a hockey blade.

Figure 5:
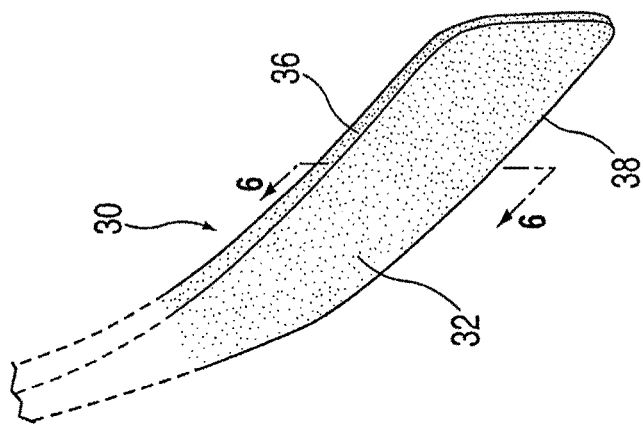
FIG. 5 is a perspective view of the blade of FIG. 5 after it is wrapped with additional layers of tape.

As shown in FIG. 3-5, the foam core includes a toe 45. The tape 40 and the tape 82 extends around the entire core, to the end of the toe 45, but for purposes of more clearly illustrating the invention in the figures, the tape 40 and tape 82 is not shown in FIG. 3-5 extending to the end of the toe 45 of the core.

The wrapped preform 80 is then placed in a mold. The mold is heated to an appropriate temperature. In one embodiment, the mold is heated to 140 degrees C. When the mold is heated, the foam 30 and tape 40 bond. The resin in the preimpregnated tape 40 and 82 melts, flows through the woven veil and bonds the materials together. Additionally, the resin in the preimpregnated tape 40 and 80 flows along the stitches 70 into the core 30. When this resin cools, it creates additional strength in the z-axis of the structure. Carbon fiber thread, which may be used in one embodiment, shrinks when it is heated. Carbon fiber thread results in a more homogenous structure because the carbon fiber thread shares properties with the carbon fiber tape.

The mold is then cooled and the formed structure is removed from the mold. The thread creates a stiffening agent that gives additional resistance against shearing.

Stitching multiple layers of tape is undesirable for several reasons. Stitching multiple layers is more difficult because it is more difficult to drive the thread through many layers of tape. The resulting structure is also more unwieldy and is not flat and smooth. The pinching that is illustrated in FIG. 8 is further amplified when multiple layers are stitched, resulting in microkinks and other deformations that are undesirable in a hockey blade. For the same reasons, it is desirable that the outer layer of the preform, the layer that contacts the mold, not be stitched.

Stitching the first layer creates the additional desirable effect that the preform is more stable during handling prior to insertion in the mold. The carbon fiber tape on the preform also is less likely to balloon outward when heated in the mold because the stitching holds the carbon fiber tape 40 against the core 30.

The use of continuous layers of tape wrapped around the entire core is advantageous over a sandwich configuration for several reasons. The hockey blade must be very durable and capable of withstanding large forces from a variety of directions. For example, the hockey blade can encounter considerable forces, such as from a puck or the surface of the ice in multiple manners and angles. Thus, the foam core needs reinforcement in all directions. The wrap configuration results in a torsionally stiffer and stronger structure. The wrap configuration also is better able to withstand shear forces.

It is to be understood that a layer of tape or material need not consist of a single unitary piece or sheet of material. For example, a layer can consist of a combination of multiple pieces or sheets that overlap.

Figure 10:
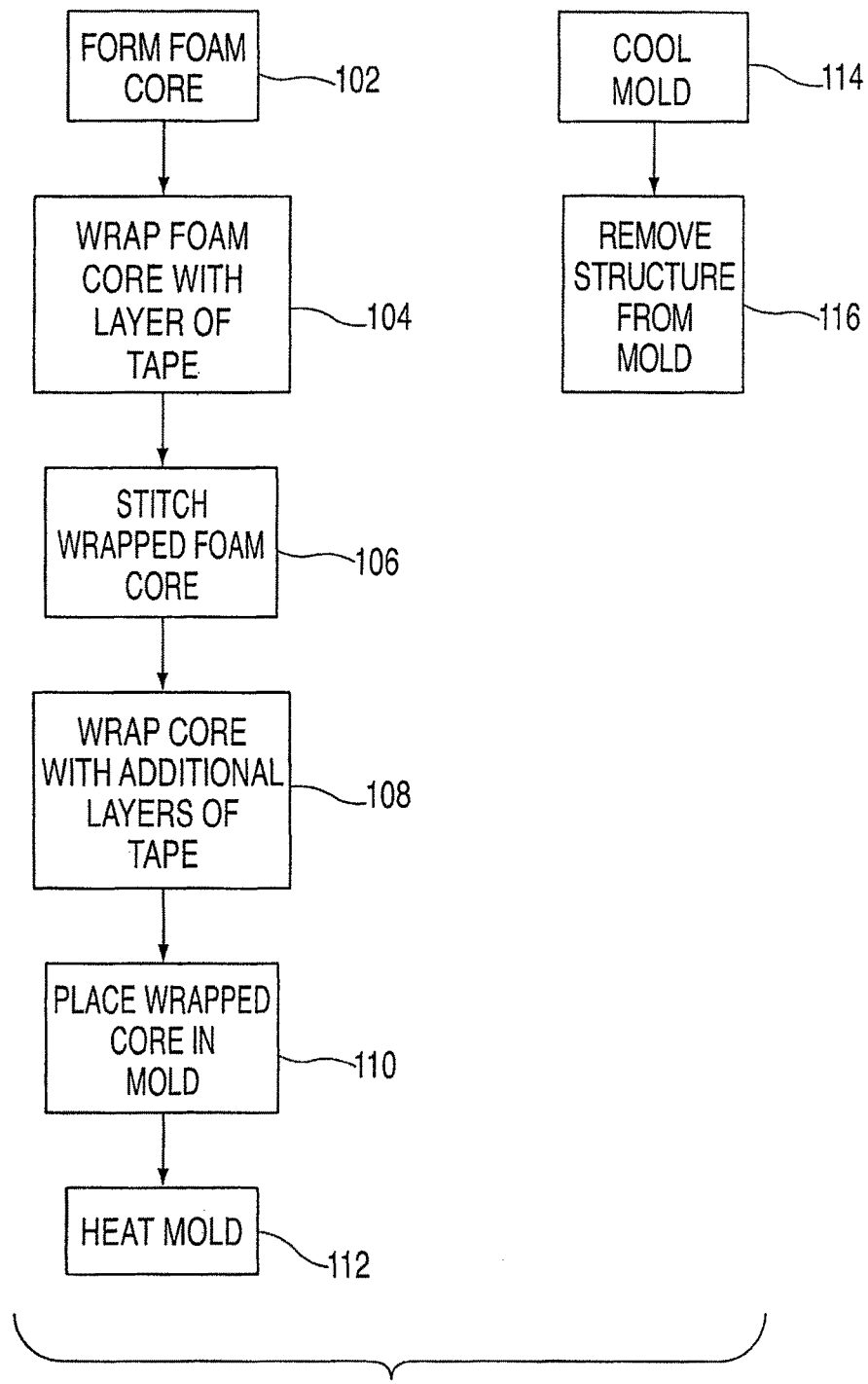
FIG. 10 is a flow diagram illustrating steps of a process to fabricate a blade in accordance with the invention.

The steps of the process are illustrated in FIG. 10. A foam core is formed as shown at 102. The foam core is wrapped with a first layer or layers of fiber tape as shown at 104. The first layer of fiber tape extends continuously along the first core face, top core edge, second core face and bottom core edge of the foam core, wherein the wrapped core has a first wrapped face, a second wrapped face, a top wrapped edge and a bottom wrapped edge. In one embodiment, a non-sticky veil is applied to the first wrapped face and second wrapped face. The wrapped foam core is stitched with a thread as shown at 106. The thread extends between and along the first wrapped face and the second wrapped face. The stitched wrapped core is wrapped with a second layer or layers of fiber tape to form a wrapped preform, as shown at 108. The second layer of fiber tape extends continuously atop the first layer of fiber tape and along the first wrapped face, the top wrapped edge, the second wrapped face and the bottom wrapped edge. The wrapped preform is placed in a mold, as shown at 110, and the mold is heated, as shown at 112. The mold is then cooled, as shown at 114, and the formed structure is removed from the mold, as shown at 116.

Figure 12:
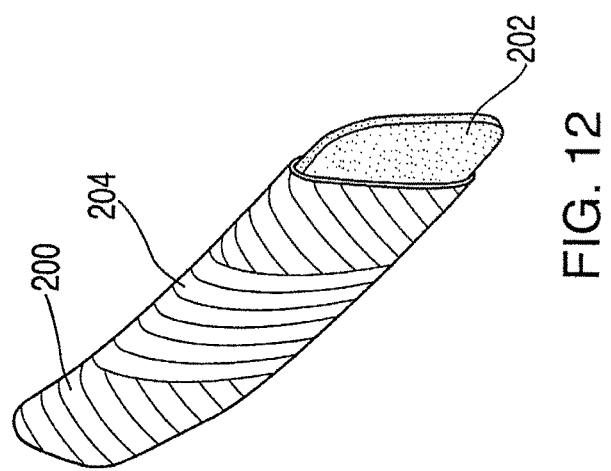
FIG. 12 is a perspective view of the blade of FIG. 11 after it is wrapped with an additional layer of tape prior to stitching.
Figure 11:
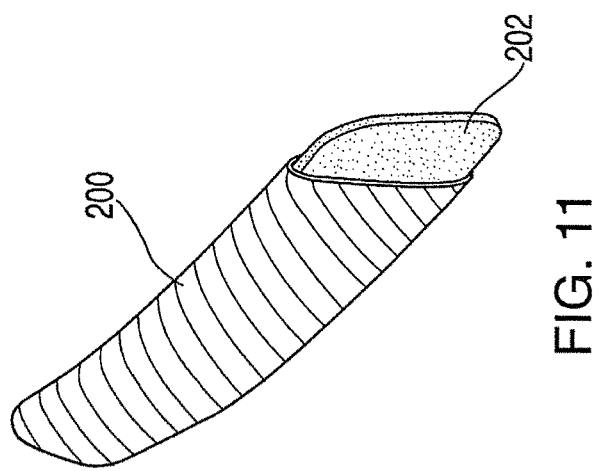
FIG. 11 is a perspective view of the blade of FIG. 2 after it is wrapped with a layer of tape in an alternative arrangement from that shown in FIG. 3.

FIGS. 11 and 12 shown an embodiment with alternative wrapping of preimpregnated carbon fiber tape 200 wrapped around the core prior to stitching. The core includes a toe 202. The tape 200 is wrapped at a 30 or 45 degree angle to the longitudinal axis of the blade. A second layer of preimpregnated tape 204 is wrapped at a 90 degree angle to the tape 200. The tape 200 and 204 extends to the end of the foam core to the toe 202 (not shown in FIGS. 11 and 12). The tape 200 and 204 extends continuously around the faces and edges of the core.

Figure 13:
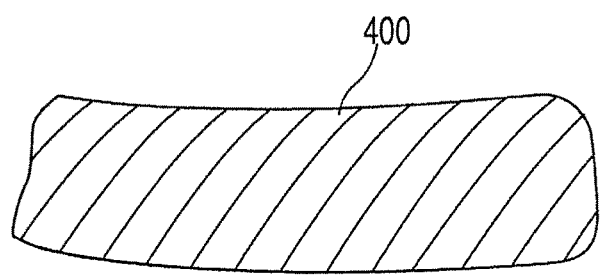
FIG. 13 is a side view of the blade of FIG. 11 wrapped with a layer of tape.
Figure 14:
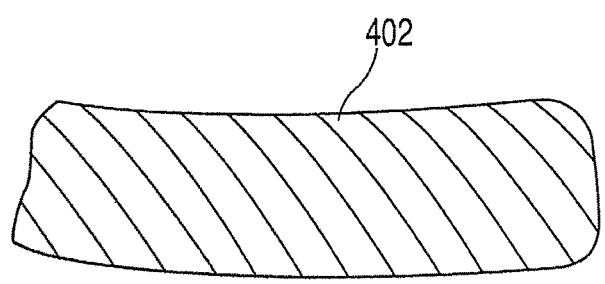
FIG. 14 is a side view of the blade of FIG. 13 wrapped with another layer of tape prior to stitching.

FIGS. 13 and 14 further illustrate the wrapping configuration of FIGS. 11 and 12. FIG. 13 shows a foam core wrapped with a layer of preimpregnated tape 400. FIG. 14 shows the foam core wrapped with a second layer of preimpregnated tape 402. After wrapping the core with tape in this configuration, a veil may be added to the wrapped core, and wrapped core is stitched, as described previously.

Referring to FIG. 5, the final layer or layers of tape that are wrapped on top of the stitched configuration prior to insertion in the mold can be applied at a variety of angles, such as the angles shown in FIGS. 11-14.

The stippling or dots in FIGS. 1-9 and 11-12 are to illustrate random air bubbles in the foam. The stippling or dots are not drawn to scale.

Figure 15:
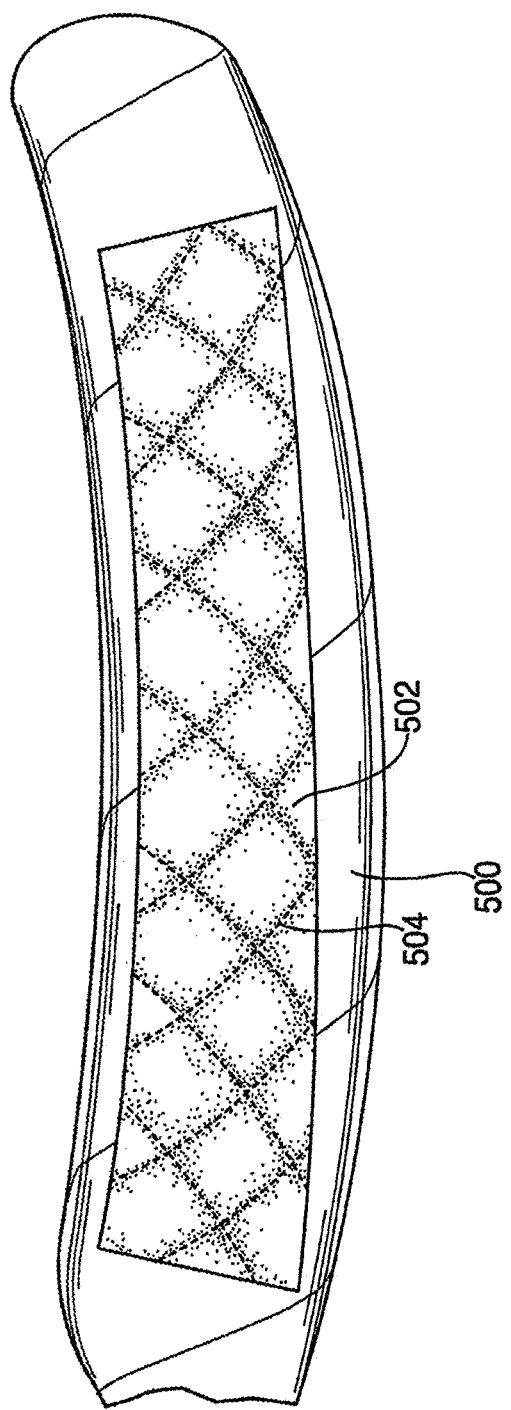
FIG. 15 is an illustration of a stitched, wrapped preform with an alternative stitching pattern.

FIG. 15 illustrates a stitched, wrapped preform with a layer of tape 500, a second layer of tape 502 on the surface of the tape 500 and thread 504. The thread 504 is stitched in a criss-cross or diamond pattern. After stitching, an additional layer or layers of tape are wrapped around the preform before the preform is inserted into a mold.

The reader should understand that these specific examples are set forth merely to illustrate examples of the invention, and they should not be construed as limiting the invention. Many variations in the connection system may be made from the specific structures described above without departing from this invention.

While the invention has been described in detail in terms of specific examples including presently preferred modes of carrying out the invention, those skilled in the art will appreciate that there are numerous variations and permutations of the above described systems and methods. Thus, the spirit and scope of the invention should be construed broadly as set forth in the appended claims.

I claim:

1. A method of fabricating a formed structure with a stitched foam core comprising:
   forming a foam core, the core comprising a first core face, a second core face, a top core edge and a bottom core edge;
   wrapping the foam core with a first layer of fiber tape, the first layer of fiber tape extending continuously along the first core face, top core edge, second core face and bottom core edge of the foam core, wherein the wrapped core has a first wrapped face, a second wrapped face, a top wrapped edge and a bottom wrapped edge;
   stitching the wrapped foam core with a thread, the thread extending between and along the first wrapped face and the second wrapped face to form stitches on the wrapped foam core;
   wrapping the stitched wrapped core with a second layer of fiber tape such that the stitches on the wrapped foam core are covered with the second layer of fiber tape;
   placing the preform in a mold;
   heating the mold;
   cooling the mold; and
   removing the formed structure from the mold.

2. The method according to claim 1 wherein the formed structure is a hockey blade.

3. The method according to claim 2 wherein the fiber tape is carbon fiber tape preimpregnated with resin.

4. The method according to claim 3 wherein the second layer of tape is substantially thicker than the first layer.

5. The method according to claim 4 wherein a single layer of fiber tape is used in the step of wrapping the foam core with a first layer of fiber tape.

6. The method according to claim 4 wherein a plurality of layers of tape are used in the step of wrapping the stitched preform with a second layer of fiber tape.

7. The method according to claim 6 wherein the thread is polyester.

8. The method according to claim 7 further comprising the step of, after wrapping the foam core with a first layer of fiber tape, placing a non-tacky veil on the first wrapped face and the second wrapped face of the wrapped core.

9. The method according to claim 6 wherein the thread is carbon fiber.

10. The method according to claim 8 wherein the stitching follows a predetermined criss-cross pattern.

11. A method comprising:
forming a foam core;
wrapping the foam core with a first layer of fiber tape;
stitching the wrapped foam core with a thread, the thread extending between and along a first wrapped face and a second wrapped face to form stitches on the wrapped foam core;
wrapping the stitched wrapped core with a second layer of fiber tape such that the stitches on the wrapped foam core are covered with the second layer of fiber tape to form a preform;
placing the preform in a mold;
heating the mold;
cooling the mold; and
removing the formed structure from the mold.

12. The method according to claim 11 wherein the formed structure is a hockey blade.

13. The method according to claim 11 wherein the fiber tape is carbon fiber tape preimpregnated with resin.

14. The method according to claim 13 wherein the second layer of tape is substantially thicker than the first layer.

15. The method according to claim 14 wherein a single layer of fiber tape is used in the step of wrapping the foam core with a first layer of fiber tape.

16. The method according to claim 11 further comprising the step of, after wrapping the foam core with a first layer of fiber tape, placing a non-tacky veil on the first wrapped face and the second wrapped face of the wrapped core.

17. A method comprising:
forming a foam core;
wrapping the foam core continuously with a first layer of fiber tape;
placing a non-tacky veil on a portion of the wrapped core;
stitching the wrapped foam core with a thread, the thread extending between and along a first wrapped face and a second wrapped face of the wrapped core to form stitches on the wrapped foam core;
wrapping the stitched wrapped core with a second layer of fiber tape such that the stitches on the wrapped foam core are covered with the second layer of fiber tape;
placing the preform in a mold;
heating the mold;
cooling the mold; and
removing the formed structure from the mold.

18. The method according to claim 17 wherein the formed structure is a hockey blade.

19. The method according to claim 17 wherein the fiber tape is carbon fiber tape preimpregnated with resin.

20. The method according to claim 17 wherein the second layer of tape is substantially thicker than the first layer.

21. The method according to claim 20 wherein a single layer of fiber tape is used in the step of wrapping the foam core with a first layer of fiber tape.

\* \* \* \* \*